United States Patent [19]

Precht et al.

[11] Patent Number: 5,012,556
[45] Date of Patent: May 7, 1991

[54] HINGE FOR COVERS IN MACHINES FOR MAKING HOT BEVERAGES

[75] Inventors: Hans-Jürgen Precht; Rudolf Maass, both of Solingen, Fed. Rep. of Germany

[73] Assignee: Robert Krups Stiftung & Co. KG, Solingen, Fed. Rep. of Germany

[21] Appl. No.: 348,300

[22] Filed: May 5, 1989

[30] Foreign Application Priority Data

May 18, 1988 [DE] Fed. Rep. of Germany ....... 3816816

[51] Int. Cl.⁵ ................................................ E05D 3/06
[52] U.S. Cl. ........................................ 16/366; 16/368
[58] Field of Search ........................... 16/368, 366, 365

[56] References Cited

U.S. PATENT DOCUMENTS

| | | | |
|---|---|---|---|
| 946,587 | 1/1910 | Thomas | 16/366 |
| 1,304,751 | 5/1919 | Drlica | 16/365 |

Primary Examiner—Richard K. Seidel
Assistant Examiner—Carmine Cuda
Attorney, Agent, or Firm—Peter K. Kontler

[57] ABSTRACT

A coffee or tea making machine wherein the receptacle for fresh water has an open top which is reinforced by a frame supporting two pivotable covers having flat walls defining a narrow straight clearance and being pivotally connected to each other for movement between substantially horizontal positions in which they overlie the respective portion of the receptacle and second or open positions in which the pivoted cover overlies the other cover. The hinge between the covers has a one-piece plastic carrier with two pairs of studs or with two pairs of sockets which extend into or receive complementary sockets or studs at the inner sides of the covers. The carrier has a median portion which extends across the clearance between the walls of the covers and two spaced-apart cheeks each of which carries two coaxial studs or two aligned sockets. A portion of the rim of each cover is bent to extend into the adjacent slot in the wall of the other cover to thus prevent movements of the covers relative to each other in the longitudinal direction of the clearance.

15 Claims, 2 Drawing Sheets

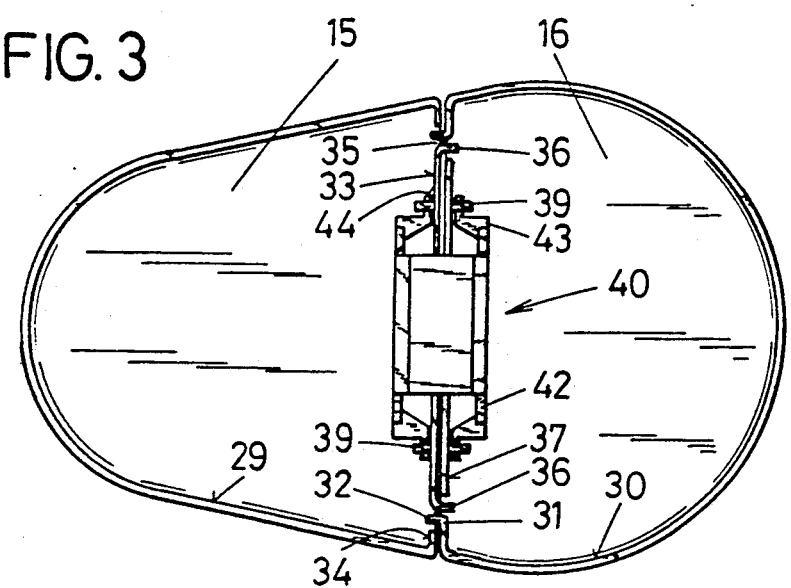
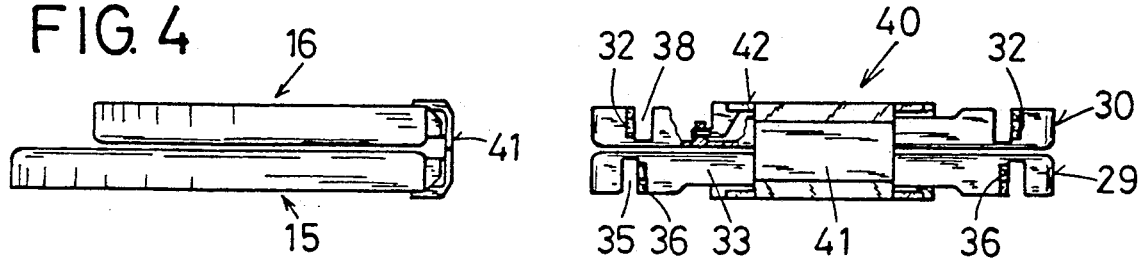
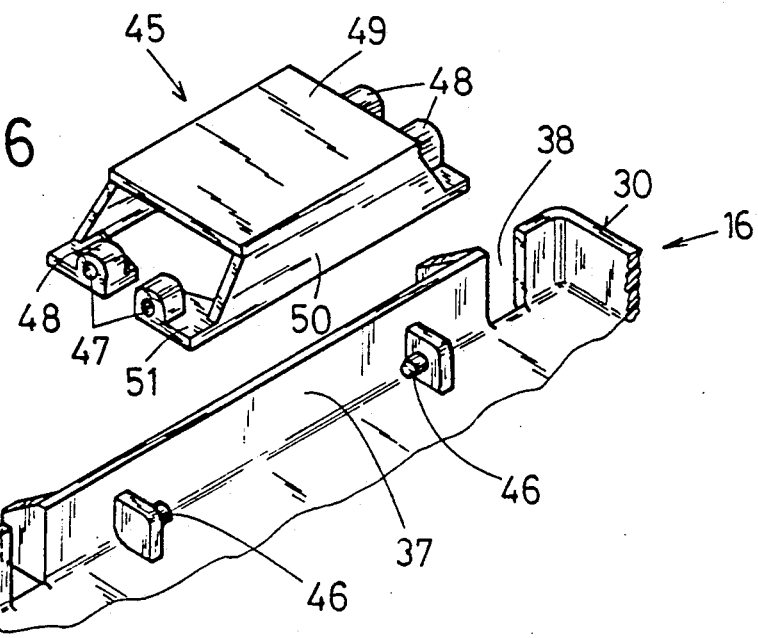
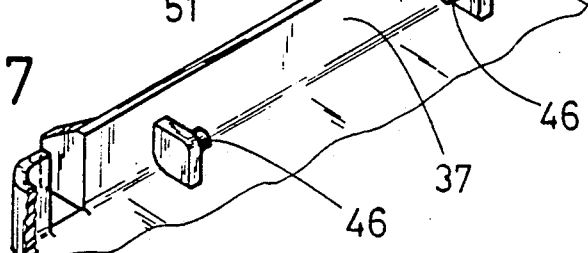

HINGE FOR COVERS IN MACHINES FOR MAKING HOT BEVERAGES

BACKGROUND OF THE INVENTION

The invention relates to hinges in general, and more particularly to improvements in hinges which can be used to pivotally connect pairs of covers, lids or like parts. Still more particularly, the invention relates to hinges which can be used with advantage in certain types of machines for making hot beverages such as coffee, tea and chocolate. The invention will be described primarily with reference to coffee makers; however, it is to be understood that the novel hinge can be used with equal or similar advantage in machines for brewing tea, hot chocolate and/or other hot beverages.

A coffee maker normally comprises a housing which supports a receptacle for fresh water and a filter holder which can receive a metered quantity of comminuted coffee beans. An electric heater in the housing heats fresh water which is caused to issue from the receptacle, and heated water flows in a riser on its way into contact with the flavoring agent in the filter holder. Freshly brewed coffee leaves the filter holder and gathers in a coffee pot or another suitable vessel beneath the filter holder. The housing further confines various electrical and electronic components of the circuitry for the water heater and, if desired, for a device which heats the bottom wall of the coffee pot.

In many coffee makers, the open top of the receptacle is normally closed by two covers each of which is pivotally mounted on the receptacle so that it can assume a first or closed position in which it overlies the adjacent portion of the receptacle, and a second or open position in which it exposes the adjacent part of the receptacle, for example, to permit inflow of a fresh or additional supply of water, to afford access to the filter in the filter holder, to afford access to the topmost portion of the riser and/or to permit observation of the quantity of water in the receptacle.

The hinges for covers in such machines are invariably designed in such a way that they project, at least in part, above the upper sides of the covers in the first or closed positions of the covers. This detracts from the appearance of the machine. Moreover, presently known hinges which are designed to permit pivoting of each cover through an angle of approximately 180° are rather bulky, complex and expensive. In addition, assembly of such hinges with the covers is a time-consuming operation.

OBJECTS OF THE INVENTION

An object of the invention is to provide a novel and improved hinge which can be used in a machine for making hot beverages and is constructed and assembled in such a way that it does not adversely affect the appearance of the machine.

Another object of the invention is to provide a hinge which is fully concealed when the covers are maintained in closed positions.

A further object of the invention is to provide a simple, compact and inexpensive hinge which can be assembled in a time-saving operation.

An additional object of the invention is to provide novel and improved covers which embody parts of the above outlined hinge.

Still another object of the invention is to provide a novel and improved machine which employs the above outlined covers.

A further object of the invention is to provide a hinge which comprises a small number of parts, the parts of which can be mass-produced in available machines, and which can be put to use as a means for articulately connecting covers to be employed in existing types of coffee makers, tea makers and like machines.

An additional object of the invention is to provide a hinge which is disposed at the inner or concealed sides of the covers when the covers are maintained in their closed positions and which need not protrude beyond the outer sides of the covers.

SUMMARY OF THE INVENTION

The invention resides in the provision of a novel combination of parts which is preferably embodied in a machine for brewing hot beverages and comprises a housing, a liquid storing component (particularly a receptacle for fresh water or cold milk which has an open top) on or in the housing, preferably also a second component (e.g., a filter holder) for confinement of a flavoring agent adjacent the liquid storing component, first and second covers which are disposed above the liquid storing component, and a hinge which articulately connects the covers to each other for movement of each cover between a substantially horizontal first or closed position in which the cover overlies the liquid storing component and a second position in which one of the covers overlies the other cover. The covers have inner sides which confront the liquid storing component in the first positions of the covers and outer sides opposite the respective inner sides. In accordance with a feature of the invention, the hinge is disposed at the inner sides of the covers.

The covers have neighboring portions which define an elongated clearance, and the hinge comprises a carrier which extends across the clearance at the inner sides of the covers, first coupling means provided on the portions of the covers, and second coupling means provided on the carrier. One of the coupling means includes studs or pintles, and the other coupling means includes sockets or bearings for the pintles. The portions of the covers preferably constitute substantially straight walls which are adjacent and substantially parallel to each other and flank the clearance in the first positions of the covers. The walls have first or outer sides which face each other, and second or inner sides which face away from each other in the first positions of the covers. The first coupling means are disposed at the second sides of and can be integral with the walls.

In one of two presently preferred embodiments of the hinge, the first coupling means (at the outer sides of the walls of the covers) include the sockets for the pintles, i.e., the pintles are provided on the carrier.

The carrier preferably comprises a main or median portion which extends across the clearance, and first and second sidewalls (hereinafter called cheeks) which flank the median portion and are adjacent the inner sides of the first and second covers, respectively The second coupling means are provided on the cheeks of the carrier. The cheeks are preferably integral with the median portion of the carrier, and the second coupling means are preferably integral with the respective cheeks.

The end portions of the cheeks can extend substantially transversely of the clearance, and the second coupling means can include coupling elements (e.g., the aforementioned pintles) which are provided on the end portions of the cheeks. If such coupling elements are pintles, they extend in substantial parallelism with the walls of the covers. The end portions of the cheeks abut the inner sides of the adjacent covers in the first positions of the covers, and such end portions abut the walls of the respective covers in the second positions of the covers. Each wall preferably extends through a predetermined distance substantially at right angles to the plane of the main portion of the respective cover, and the median portion of the carrier has a width (as measured transversely of the clearance) which is at least twice the predetermined distance.

The improved combination of covers and carrier preferably further comprises means for preventing movements of the covers relative to each other in the longitudinal direction of the clearance. The preventing means can include suitably bent parts of marginal rims which extend beyond the inner sides of the main portions of the covers and include the aforementioned walls. The walls can be provided with recesses for the aforementioned parts of the rims. The arrangement is such that at least one part of the rim on one of the covers extends into a recess of the wall forming part of the other cover and vice versa. It often suffices to provide a single recess in only one of the walls and to provide the rim of the cover embodying the other wall with a part which extends into such single recess.

If the first coupling means includes pintles, such pintles are provided at the inner sides of the walls of the covers, and the cheeks of the carrier are then provided with sockets for the pintles. The sockets are preferably provided on or in the end portions of the cheeks (these cheeks extend in parallelism with the clearance which is located between them). The sockets are preferably integral with the respective end portions of the corresponding cheeks, and the cheeks are preferably integral with the main or median portion of the carrier. Each end portion can constitute or resemble a lug, and each lug on one of the cheeks preferably extends toward a lug on the other cheek. Each socket can include a simple friction bearing with an axial recess or hole for the corresponding pintle on the adjacent cover.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a bottom plan view of the covers and of one embodiment of the improved hinge; the covers being shown in their first positions;

FIG. 4 is a side elevational view of the covers with one of the covers shown in the second position;

FIG. 5 is an end elevational view as seen from the right-hand side of FIG. 4;

FIG. 6 is a perspective view of a carrier which can be used in a modified hinge; and FIG. 7 is a fragmentary perspective view of one of the covers which can be articulately connected to each other by a hinge employing the carrier of FIG. 6.

DESCRIPTION OF PREFERRED EMBODIMENTS

Figure 1:
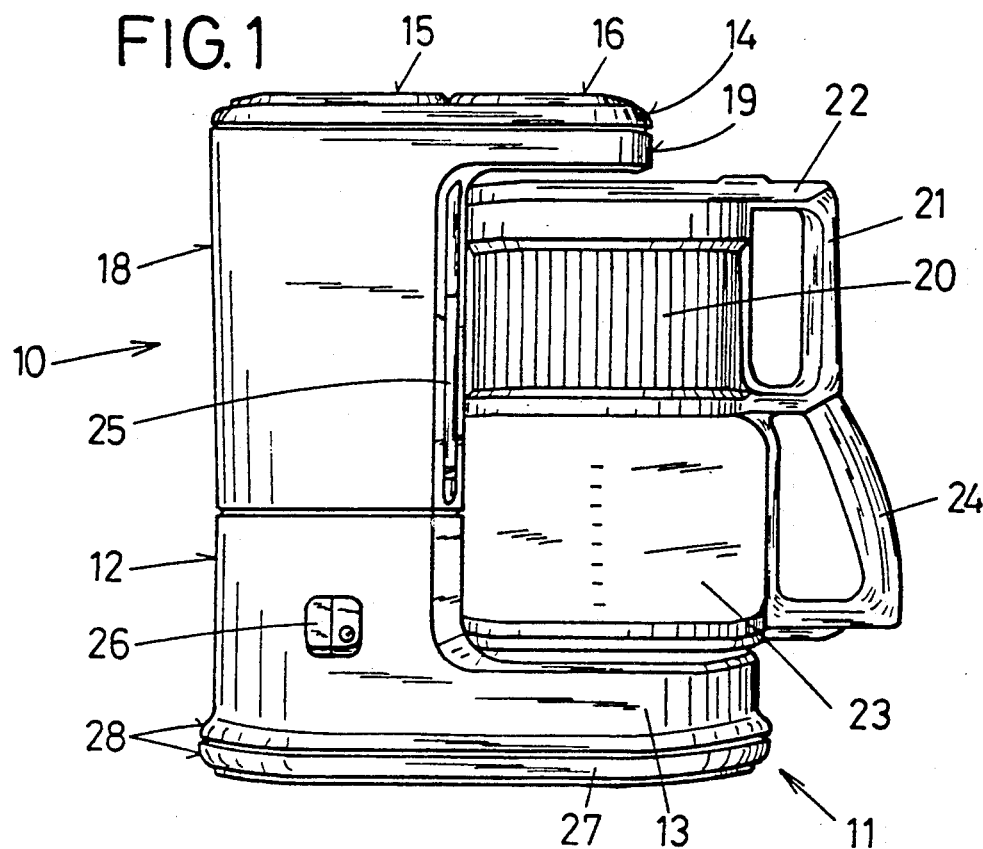
FIG. 1 is a side elevational view of a machine for making hot beverages wherein the covers are pivotally connected to each other by a hinge which embodies the present invention.

FIG. 1 shows a machine 10 (e.g., a coffee maker) for brewing hot beverages wherein two covers or lids 15, 16 are pivotally connected to each other by a hinge (shown in FIGS. 3, 4 and 5) which embodies one form of the invention. The machine 10 comprises a substantially L-shaped hollow housing 11 which is preferably made of a plastic material and includes a relatively short upright section or column 12 and a longer horizontal section or base 13. The housing 11 serves to confine and support an electric heater in the base 13 as well as numerous electrical and electronic components of the circuit for the heater. FIG. 1 merely shows an on-off switch 26 which can be actuated to complete or open the circuit of the heater. The exact construction of the heater and/or of its circuit forms no part of the invention. Reference may be had to numerous granted United States and foreign patents and patent applications of the assignee of the present invention as well as to numerous coffee makers and tea makers which are distributed by the assignee of the present application all over the world including machines of the type known as "Brewmaster" (coffee/tea maker #150), Brewmaster II" (coffee/tea maker #158) and "Brewmaster Jr." (coffee/tea maker #170). The heater is preferably of the flow through type wherein a stream of liquid (e.g., water or milk) is caused to flow from a source toward contact with a flavoring agent (such as tea leaves, powdered chocolate or comminuted coffee beans).

The open underside of the base 13 of the housing 11 is closed by a bottom wall 27 which is separably secured to the housing. The reference character 28 denotes two marginal beads which are provided on adjacent portions of the base 13 and bottom wall 27 and are separably secured to each other by complementary male and female detent elements or in any other suitable way not forming part of the invention.

The upright section 12 of the housing 11 supports a detachable or more or less permanently installed liquid storing hollow first component 18 which is a receptacle for storage of fresh (cold) water if the machine 10 is a coffee maker As a rule, the receptacle 18 is detachably secured to the section 12 of the housing 11 by a suitable coupling device which ensures that an outlet in or close to the bottom wall of the receptacle is in register with the intake end of a conduit serving to convey a stream of fresh liquid from the interior of the receptacle, through the electric heater in the interior of the base 13 and thereupon into a riser which conveys heated liquid into a second hollow component 20 in the form of a filter holder beneath a horizontal extension 19 of the upper end portion of the receptacle 18. The riser preferably extends through the receptacle 18 and its extension 19 and has an outlet for heated liquid at a level above the detachable cover or lid 22 of the holder 20. The latter further comprises a customary handle 21 and can receive a standard filter for a metered quantity of comminuted coffee beans if the machine 10 is a coffee maker. The riser includes a vertical or upright portion which extends from the heater in the base 13 to the level of the extension 19, and a substantially horizontal portion which is provided in the extension 19 and serves to deliver heated liquid to an opening in the lid 22. The lid 22 is detachable from the major portion of the holder 20 and can be omitted altogether if the extension 19 is sufficiently large to overlie the entire upper side of the main portion of the holder. This holder rests on top of a vessel 23 (e.g., a coffee pot which is made of glass or other light-transmitting material) serving for temporary storage of hot beverage which flows from a preferably centrally located outlet opening in the bottom wall of the holder 20. The vessel 23 has a handle 24 and its bottom wall rests on a heating plate or grid which is recessed into the top wall of the base 13 and serves to ensure that the beverage in the vessel 23 will be maintained at a selected temperature The tubular portion of the vessel 23 is provided with indicia denoting the number of cups which can be filled with beverage in the vessel.

The receptacle 18 carries a conventional water level indicator 25 which includes an upright pipe having a lower end portion in communication with the lower portion of the receptacle so that the upper level of the column of liquid in the pipe matches the upper level of the body of liquid in the receptacle. The level indicator 25 can be omitted if the receptacle 18 is made of or includes a portion made of light-transmitting material.

The upper portion of the receptacle 18 supports and is reinforced by an endless frame 14 which is a separately produced part and is separably or more or less permanently affixed to and overlies the open top of the receptacle and its extension 19. The frame 14 renders it possible to employ a lightweight receptacle 18 with relatively thin walls.

The frame 14 pivotally supports the covers 15, 16 each of which is pivotable between a horizontal first position (shown in FIGS. 1, 2 and 3) and a second position in which it overlies the other cover. Thus, one of the covers 15, 16 remains in the horizontal position when the other cover is pivoted through approximately or exactly 180° to reach the second position in which it overlies the one cover. FIGS. 4 and 5 shows the cover 16 in the second position on top of the cover 15 which dwells in the first position.

The cover 15 normally overlies the upper end of the main portion of the receptacle 18, and the cover 16 normally overlies the extension 19 and the horizontal or nearly horizontal portion of the aforementioned riser which conveys heated liquid from the electric heater in the base 13 to the holder 20. Those portions(shown at 33 and 37 in FIG. 3) of the covers 15, 16 which are adjacent each other define an elongated straight clearance or gap 17 which is narrow or very narrow or the width of which is actually reduced to zero when the covers 15, 16 assume the first positions of FIGS. 1 to 3. If the extension 19 of the receptacle 18 is enlarged in the aforedescribed manner so that it overlies the entire holder 20, pivoting of the cover 16 to the second position of FIGS. 4 and 5 affords access to the substantially horizontal portion of the riser in the extension 19 as well as to the filter in the holder 20. This not only necessitates the provision of a larger cover 16 but also the provision of a larger frame 14. The latter has an inwardly extending flange which serves as an abutment and support for the marginal rims 29, 30 (FIGS. 3 and 5) which surround the major portions of the covers 15 and 16. The rims 29, 30 rest on the inwardly extending flange of the frame 14 when the corresponding covers 15, 16 assume their first positions. The flange can constitute a separately produced or an integral part of the reinforcing frame 14.

Figure 2:
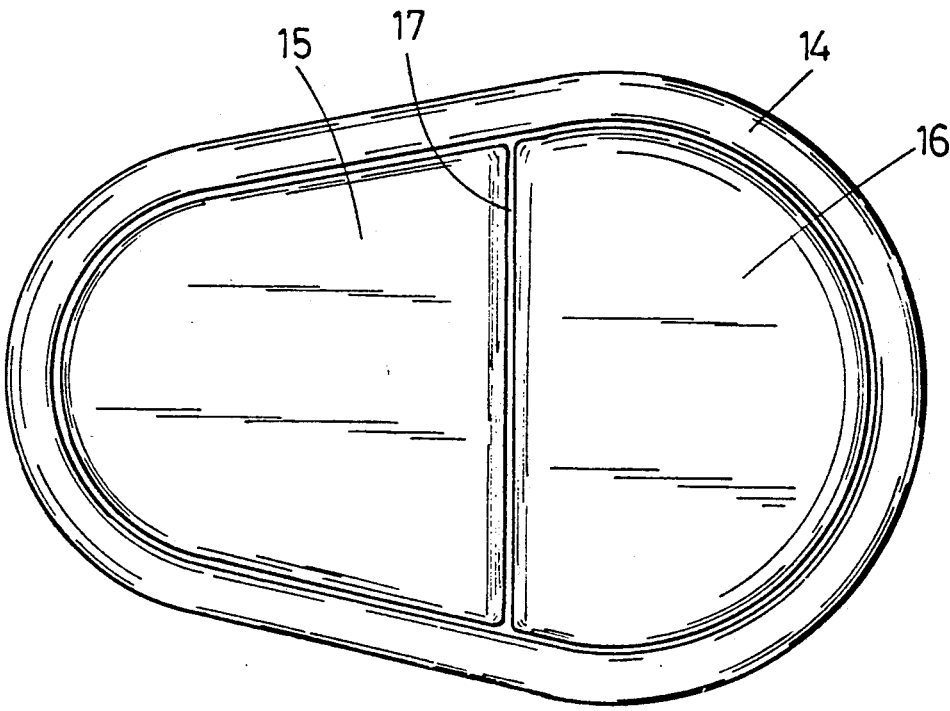
FIG. 2 is an enlarged plan view of the covers and of a reinforcing frame which pivotably supports the covers.

In accordance with a feature of the invention, the covers 15, 16 are pivotally connected to each other by a novel and improved hinge one embodiment of which is shown in FIGS. 3 to 5 and which enables each of these covers to turn through approximately 180° between the first position of FIGS. 1 to 3 and a second position corresponding to the second position of the cover 16 in FIGS. 4 and 5. The hinge includes a first part at the inner side of the cover 15, a second part at the inner side of the cover 16, and a one-piece carrier 40 which can be made of a plastic material and overlies the portions 33, 37 of the two covers as well as the median portion of the clearance 17. The covers 15, 16 carry the halves of a first coupling device including a pair of sockets 39 on each of the covers, and the carrier 40 is provided with a second coupling device including two pairs of stubs or pintles 44 each of which is receivable in and can turn relative to one of the sockets 39.

The carrier 40 includes a flat plate-like main or median portion 41 having a width which at least slightly exceeds the combined height of the neighboring walls 33, 37 forming part of or constituting those portions of the covers 15, 16 which define and flank the clearance 17. The width of the median portion 41 is measured transversely of the clearance 17, and the height of the walls 33, 37 corresponds to the distance through which these walls extend laterally of and beyond the inner sides of main portions of the covers 15 and 16 respectively This can be readily seen in FIG. 4. The carrier 40 further comprises two lateral walls or cheeks 42 which extend laterally of the main portion 41 and form with the latter a substantially U-shaped body. The cheeks 42 extend into the interior of the adjacent covers 15, 16 (i.e., within the confines of the rims 29, 30) when the covers are caused to assume their first positions. However, the cheeks 42 flank the adjacent walls 33, 37 when one of the covers 15, 16 is caused to assume its second position, i.e., when the one cover is pivoted through 180° about an axis which is defined by the respective pair of coaxial pintles 44.

The carrier 40 is preferably made of a plastic material which exhibits a certain amount of elasticity so that the cheeks 42 can undergo some deformation in order to permit introduction of their pintles 44 into the recesses or through holes of the respective sockets 39. The cheeks 42 are thereupon permitted to assume their normal shapes and to thus maintain the pintles 44 in the respective sockets 39.

The outer or first sides of the walls 33, 37 are closely adjacent or actually abut each other in the first positions of the covers 15 and 16. The sockets 39 are provided at the inner sides of the walls 33 and 37, i.e., at those sides which face away from the clearance 17. Each socket 39 is integral with the wall (33 or 37) of the respective cover.

The lug-shaped end portions 43 of the cheeks 42 extend toward the clearance 17 and each of these end portions carries a pintle 44. The pintles 44 are parallel to the clearance 17, and the pintles on each cheek 42 are coaxial with one another. One side of each end portion 43 preferably lies flat against the inner side of the respective cover when the covers are maintained in their first positions. On the other hand, when one of the covers 15, 16 is pivoted to the second position, the end portions 43 preferably lie against the respective walls 33, 37 (see FIG. 5).

Each cover is mounted in the frame 14 for pivotal movement about the common axis of the respective pair of pintles 44. The connections can include pivot members which are provided on the rims 29, 30 or on the frame 14. It is also possible to simply insert the covers 15, 16 into the frame 14 so that they rest on the aforementioned inwardly extending flange of the frame as long as they remain in their first positions.

The structure which is shown in FIGS. 3 to 5 further comprises means for preventing movements of the covers 15, 16 relative to each other in the longitudinal direction of the clearance 17. Such preventing means comprises parts 32 of the rim 30 of the cover 16. The parts 32 are bent-over lugs of those portions (31) of the rim 30 which are adjacent the clearance 17 and portions 34 of the rim 29 and extend into adjacent recesses or slots 35 in the wall 33 of the cover 15. These lugs prevent transverse shifting of the cover 16 while the latter is caused to pivot between its first and second positions and while the cover 16 dwells in the first position which is shown in FIGS. 1 to 3. The wall 33 (which is actually a portion of the rim 30) has suitably bent parts in the form of lugs 36 which extend into the adjacent recesses or slots 38 of the wall 37 while the cover 15 pivots between its first and second positions and while the cover 15 is held in its first position.

The fact that the lugs 32 do not extend into the respective slots 35 in the second position of the cover 16 and that the lugs 36 do not extend into the adjacent slots 38 in the second position of the cover 15 is of no consequence because shifting of covers 15, 16 in the longitudinal direction of the clearance 17 would be likely to take place during pivoting of the covers and also because FIG. 3 shows that properly inserted pintles 44 cooperate with the adjacent sockets 39 to oppose appreciable movements of the cover 15 and/or 16 in the longitudinal direction of the clearance 17.

The second position of the cover 15 is not shown in the drawing When the cover 15 assumes such second position, it rests on top of the cover 16, i.e., the combination of the covers 15, 16 with the improved hinge including the carrier 40 then assume a position corresponding to that shown in FIG. 4 but turned through 180° so that the cover 15 overlies the cover 16.

The outer sides of the covers 15, 16 are flat. This is possible because the entire hinge is disposed at the inner sides of the covers. Each cover can be provided with a knob to facilitate pivoting between open and closed positions. The hinge is fully concealed in the closed positions of the covers 15, 16. Those parts of the hinge which are integral with the covers 15, 16 are produced at the time of making of the respective covers. The same holds true for the parts 32, 36 of those portions (34, 31) of the rims 29, 30 which form part of the means for preventing movements of the covers 15, 16 relative to each other in the longitudinal direction of the clearance 17.

FIGS. 6 and 7 show a portion of a second hinge which employs a modified carrier 45 having a flat plate-like median portion 49 and two lateral walls or cheeks 50 which flank the median portion 49 and have end portions 51 in the form of lugs integral with sockets 48 each of which includes a bearing with a recess or through hole 47. The lugs 51 of one of the cheeks 50 extend toward the lugs 51 of the other cheek 50. The walls 33, 37 of the covers 15 and 16 (only the wall 37 of the cover 16 is shown in FIG. 7) have pairs of coaxial studs or pintles 46 each of which can be caused to snap into the hole or recess 47 of one of the sockets 48. In all other respects, the hinge which includes the structure of FIGS. 6 and 7 can be identical with or analogous to the hinge of FIGS. 3 to 5. The main difference is that the carrier 40 of the first hinge is provided with pintles 44 and the carrier 45 of the second hinge is provided with sockets 48.

The carrier 45 can be made of one piece of suitable plastic material. The cheeks 50 extend substantially at right angles to the median portion 49 of the carrier 45. The end portions 51 are spaced apart from the plane of the median portion 49 and each cheek 50 has two edge faces (not referenced but shown in FIG. 6) which make oblique angles with the plane of the median portion 49. The width of the space between each pair of neighboring end portions 51 suffices to provide room for the walls 33, 37 of the covers. The plane of the end portions 51 are preferably parallel to the plane of the median portion 49 of the carrier 45. The sockets 48 extend from the respective end portions 51 toward the median portion 49 of the carrier 45.

The pintles 46 are spaced apart from the inner sides of the respective walls 33 and 37. Each of these pintles is integral with a plate-like support which, in turn, is integral with the respective wall 33, 37.

The material of the carrier 45 is at least slightly elastic so that its cheeks 50 can be temporarily deformed during introduction of pintles 46 into the respective sockets 48. Once the carrier 45 is permitted to reassume its undeformed state, it reliably holds the pintles 46 in the holes 47 of the adjacent sockets 48 to prevent accidental disengagement of the carrier from the covers 15, 16 as well as to oppose movements of the covers 15, 16 relative to each other in the longitudinal direction of the clearance 17.

The illustrated hinge is susceptible of many additional modifications. For example, the configuration of the carrier can depart from that of the carrier 40 or 45. The same applies for the covers 15 and 16; the shape of the covers will be selected in dependency on the configuration of the corresponding parts of the upper end portion of the receptacle 18 and its extension 19. It is also possible to employ two identical covers in order to reduce the cost of the beverage making machine. Still further, the improved hinge can be used in many other types of coffee makers, tea makers or analogous machines wherein two covers or lids are to be articulately connected to each other for pivotal movement between open and closed positions, e.g., through angles of 180°. The cheeks 42 or 50 may but need not extend at right angles to median portion 41 or 49 of the carrier 40 or 45. For example, each cheek can gradually merge into the adjacent part of the median portion so that the carrier assumes a substantially C-shaped outline. The median portion of the carrier may but need not be flat, and the carrier can but need not be made of one piece of plastic material. It is also possible to employ a metallic carrier Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should are are intended to be comprehended

We claim:

1. In a machine for brewing hot beverages, the combination of a housing; at least one liquid-receiving component on said housing; a first and second covers disposed above said component, said covers having neighboring portions defining a clearance; a hinge articulately connecting said covers to each other for movement of each cover between a substantially horizontal first position in which the covers overlie said component and a second position in which one of the covers overlie the other cover, said covers having inner sides confronting said component in the first positions of the covers and outer sides opposite the respective inner sides, said hinge being disposed at said inner sides and comprising a carrier extending across said clearance, first coupling means provided on said portions of said covers and second coupling means provided on said carrier, one of said coupling means including pintles and the other of said coupling means including sockets for said pintles; and means for preventing movements of said covers with reference to each other in the longitudinal direction of said clearance, said covers further comprising marginal rims at said inner sides thereof and said preventing means including a portion of at least one of said rims, said portion of at least one of said covers having a recess which receives a portion of the rim of the other cover in the first positions of said covers.

2. The structure of claim 1, wherein said covers have neighboring portions defining a clearance and said hinge comprises a carrier extending across said clearance, first coupling means provided on said portions of said covers and second coupling means provided on said carrier, one of said coupling means including pintles and the other of said coupling means including sockets for said pintles.

3. The structure of claim 1, wherein said portions of said covers include walls which are adjacent and substantially parallel to each other and flank said clearance in the first positions of said covers, said walls having first sides facing toward each other and second sides facing away from each other in the first positions of said covers, said first coupling means being disposed at the second sides of said walls.

4. The structure of claim 3, wherein said first coupling means include said sockets.

5. The structure of claim 3, wherein said first coupling means are integral with said walls.

6. The structure of claim 3, wherein said carrier includes a median portion extending across said clearance and first and second cheeks flanking said median portion and adjacent the inner sides of said first and second covers, respectively, said second coupling means being provided on said cheeks.

7. The structure of claim 6, wherein said covers further include main portions and each of said walls extends inwardly a predetermined distance from the respective main portion, said median portion having a width transversely of said clearance which is at least twice said predetermined distance.

8. The structure of claim 6, wherein said cheeks are integral with said median portion and said second coupling means are integral with the respective cheeks.

9. The structure of claim 6, wherein said second coupling means include said pintles.

10. The structure of claim 6, wherein said cheeks have end portions extending substantially transversely of said clearance and said second coupling means includes coupling elements provided on said end portions.

11. The structure of claim 10, wherein said coupling elements are pintles and extend in substantial parallelism with said walls.

12. The structure of claim 10, wherein said end portions abut the inner sides of the respective covers in the first positions of the covers, said end portions abutting said portions of the respective covers in the second positions of said covers.

13. In a machine for brewing hot beverages, the combination of a housing; at least one liquid-receiving component on said housing; first and second covers disposed above said component, said covers having neighboring portions defining a clearance; and a hinge articulately connecting said covers to each other for movement of each cover between a substantially horizontal first position in which the covers overlie said component and a second position in which one of the covers overlie the other cover, said covers having inner sides confronting said component in the first positions of the covers and outer sides opposite the respective inner sides, said hinge being disposed at said inner sides and comprising a carrier extending across said clearance, first coupling means provided on said portions of said covers and second coupling means provided on said carrier, one of said coupling means including pintles and the other of said coupling means including sockets for said pintles, said portions of said covers including walls having first sides facing each other and second sides facing away from each other, said first coupling means including pintles at the second sides of said walls, said carrier including a median portion extending across said clearance and cheeks flanking said median potion at the inner sides of said covers, said cheeks having end portions and said second coupling means comprising sockets at the end portions of said cheeks, said cheeks being disposed substantially at right angles to said median portion and each of said cheeks having two spaced-apart end portions, said end portions including lugs and the lugs of one of said cheeks extending toward the lugs of the other of said cheeks.

14. The structure of claim 13, wherein each of said sockets includes a bearing element which is integral with the respective lug and has a hole or recess for one of said pintles.

15. The structure of claim 13, wherein said cheeks are integral with said median portion and said sockets are integral with the respective end portions.

* * * * *